United States Patent [19]

Tozawa et al.

[11] 4,055,372

[45] Oct. 25, 1977

[54] STORAGE RECEPTACLE FOR MAGNETIC TAPE CASSETTE

[75] Inventors: Keizaburo Tozawa, Tokyo; Hideo Amatsu; Shinichiro Takahashi, both of Yokohama; Kazumi Fujimoto, Hoya; Kishio Ikeda, Tokyo, all of Japan

[73] Assignee: Sony Corporation, Tokyo, Japan

[21] Appl. No.: 674,211

[22] Filed: Apr. 6, 1976

[30] Foreign Application Priority Data

June 24, 1975 Japan .................................. 50-77913

[51] Int. Cl.² ............................................ A47B 81/06
[52] U.S. Cl. ..................................... 312/15; 312/20; 312/111; 220/306; 206/387
[58] Field of Search ..................... 312/319, 12, 15, 20, 312/111; 292/87; 220/339, 306; 206/387, 265

[56] References Cited

U.S. PATENT DOCUMENTS

| | | | |
|---|---|---|---|
| 2,680,589 | 6/1954 | Nelson | 292/87 |
| 3,348,668 | 10/1967 | Amatsu et al. | 312/20 |
| 3,389,942 | 6/1968 | Jacob | 312/20 |
| 3,638,788 | 2/1972 | Solomon | 206/387 |
| 3,866,990 | 2/1975 | McRae | 312/15 |
| 3,899,229 | 8/1975 | Ackeret | 312/111 |
| 3,904,259 | 9/1975 | Hoffmann et al. | 312/111 |
| 3,909,088 | 9/1975 | Dennehey et al. | 312/20 |
| 3,968,880 | 7/1976 | Ostrowsky | 220/306 |
| 3,969,007 | 7/1976 | Lowry | 312/15 |

FOREIGN PATENT DOCUMENTS

224,840   1968   U.S.S.R. ............................... 206/387

*Primary Examiner*—Paul R. Gilliam
*Assistant Examiner*—Victor N. Sakran
*Attorney, Agent, or Firm*—Lewis H. Eslinger; Alvin Sinderbrand

[57] ABSTRACT

In a storage receptacle for a magnetic tape cassette comprising a housing having spaced apart, parallel side walls which, between their forward edges, define an opening of the housing, and a holder pivotally connected with the housing for swinging movement through such opening between an opened position in which the holder projects forwardly from the housing for receiving and relinquishing a cassette, and a closed position in which the holder cooperates with the housing for enclosing a cassette in the receptacle; the pivotal connection of the holder with the housing provides a fulcrum for the holder which is spaced rearwardly from the center of gravity of the holder with a cassette therein in all positions of the holder ranging from its closed position to its opened position so that the force of gravity urges the holder from its closed position to its opened position upon the release of a latch provided for releasably retaining the holder in its closed position, and such fulcrum for the holder is shifted forwardly at an intermediate position of the holder in moving from its closed position to its opened position so that, even when the vertical dimension of the rectangular housing does not greatly exceed the corresponding dimension of the cassette to be contained in the receptacle, a lower-front corner of the holder will not extend below the housing in the opened position of the holder at which the latter is disposed for conveniently receiving or relinquishing a cassette in the holder.

In accordance with another feature of this invention, the holder, when in its closed position, is substantially contained in the housing, and the outer surfaces of the opposite side walls of the housing have mating elongated projections and grooves of dovetail cross-sections extending from the front and rear edges of such side walls for only minor portions of the front-to-rear dimension of the side walls, so that the housings of a plurality of storage receptacles can be conveniently secured together directly in side-by-side relation with each groove of one housing slidably receiving a respective elongated projection of the next adjacent housing.

18 Claims, 13 Drawing Figures

STORAGE RECEPTACLE FOR MAGNETIC TAPE CASSETTE

BACKGROUND OF THE INVENTION

1. Field of the Invention

This invention relates generally to storage receptacles for magnetic tape cassettes, and more particularly is directed to improvements in receptacles suitable for storing magnetic tape cassettes in a manner such that each cassette is enclosed in an individual compartment or space and protected from dirt, dust and the like.

2. Description of the Prior Art

Many types of storage receptacles for magnetic tape cassettes have been proposed. For example, in U.S. Pat. No. 3,904,259, a magnetic tape cassette storage container is disclosed to include a generally rectangular casing having an opening along one of its sides through which the cassette itself is slidably inserted in, and removed from the casing. A pivoted door is provided for closing the open side of the casing, and a generally U-shaped spring is mounted, and its center, against the inner surface of the side wall of the casing opposed to the open side thereof. During the insertion of a cassette into the casing, the cassette acts against the normally U-shaped spring so as to flex or relatively flatten the latter, with the result that the spring exerts a force on the cassette tending to eject the latter from the casing. Therefore, when inserting the cassette in the casing, the cassette has to be manually held within the casing until the door is closed and latched in its closed position. The foregoing operations inconveniently require the use of two hands for insertion of a cassette. Furthermore, when the latch is released to permit opening of the door, the spring force acting on the cassette may forcibly eject the cassette completely out of the casing past the open door. Thus, the foregoing magnetic tape cassette storage container has disadvantageous characteristics both when inserting and removing a cassette. Furthermore, since the cassette is slidably inserted in, and removed from the casing of the container while acted upon by the spring, the cassette housing will become scratched or marred in the course of repeated movements into and out of the casing.

In another storage container for a mangetic tape cassette, for example, as disclosed in U.S. Pat. No. 3,899,229, a rectangular casing which is open at the front side thereof is provided with a drawer which is guided for rectilinear movements between a closed position, in which the drawer is contained within the casing with the open side of the latter being closed by the drawer front, and an opened or extended position in which a cassette can be placed in, or removed from the extended drawer. A spring is interposed between the drawer and the casing so as to continuously urge the drawer to its opened or extended position, and a latch is provided for releasably holding the drawer in its closed position against the force of such spring. Although such storage container provided with a rectilinearly slidable drawer avoids some of the problems associated with the existing storage container first described above, in that the cassette is cradled in the drawer while being inserted in, and removed from the casing and thus protected from scratching or marring, the structures provided for guiding the drawer in its rectilinear sliding movements relative to the casing tend to jam. Further, when the drawer is in its opened position, the insertion or removal of a cassette inconveniently requires rather complicated and precise manipulations of the cassette.

In still another existing storage receptacle for a magnetic tape cassette, for example, as disclosed in U.S. Pat. No. 3,909,088, the receptacle includes a housing constituted by spaced apart, L-shaped side walls having their vertical and horizontal portions connected by a back wall and a bottom wall, respectively, and a substantially rectangular container which is pivotally connected to the housing for swinging relative to the latter about an axis extending through a corner of the rectangular casing and through ends of the horizontal portions of the L-shaped side walls of the housing. In an opened position of the container in which the latter extends forwardly from the pivoting axis, the upwardly facing side of the rectangular casing is open for the insertion and removal of a cassette therethrough. When the container is pivotally moved to its closed position, the sides thereof interfit with the adjacent L-shaped side walls of the housing and the container and housing cooperate to enclose the cassette therein. Although the pivotal connection of the container with the housing is advantageous in that it is simple and not subject to binding or jamming, the location of the pivoting axis of the container is such that, with the container in its closed position and having a cassette therein, the force of gravity acts in back of the pivoting axis to urge the container to such closed position. Thus, when it is desired to remove a cassette from the storage receptacle of the foregoing type, the pivoted container has to be manually displaced from its closed position in respect to the associated housing. Further, as the pivoted container is moved toward its opened position, the center of gravity moves a relatively large distance in front of the pivoting axis so that the weight of a cassette in the container may cause an abrupt and potentially harmful final movement of the container to its opened position. It will also be noted that, since the side walls of the container and the L-shaped side walls of the housing interfit to define the opposite side surfaces of the storage receptacle in the closed condition of the latter, a plurality of such storage receptacles cannot be directly secured to each other in side-by-side relation, and an additional magazine engageable only with the relatively narrow L-shaped side walls of the housings is required for that purpose.

OBJECTS AND SUMMARY OF THE INVENTION

Accordingly, it is an object of this invention to provide an improved storage receptacle for a magnetic tape cassette which avoids the above mentioned disadvantages of the storage receptacles or containers previously proposed for that purpose.

More specifically, an object of this invention is to provide a storage receptacle for a magnetic tape cassette which facilitates the insertion and removal of the cassette without the likelihood of scratching or marring the cassette housing during such insertion and removal, and which protects the cassette from dirt, dust and the like, when the cassette is contained in the storage receptacle.

Another object is to provide an improved storage receptacle for a magnetic tape cassette, as aforesaid, in which the simple actuation of a latch causes the automatic opening of the receptacle, with the cassette being then safely held or cradled in a holder which is positioned for the convenient insertion or removal of the cassette.

Still another object is to provide a magnetic tape cassette storage receptacle, as aforesaid, which includes a housing having an opening at the front thereof, and a holder for a magnetic tape cassette movable through such front opening of the housing between an opened position in which the holder projects forwardly from the housing for receiving and relinquishing a cassette, and a closed position in which the holder cooperates with the housing for enclosing a cassette in the holder, and in which the holder is pivotally connected to the housing so as to be smoothly urged to its opened position by the force of gravity upon the release of a latch provided for retaining the holder in its closed position.

Still another object is to provide a magnetic tape cassette storage receptacle, as aforesaid, in which the housing is substantially rectangular and has its dimensions determined essentially by the size of the cassette to be stored therein, and in which the pivotal connection of the holder to the housing is arranged so that, when the holder is urged to its opened position by the force of gravity, the holder will project beyond the confines of the housing only at the open front of the latter.

A further object is to provide a magnetic tape cassette storage receptacle, as aforesaid, in which a plurality of the receptacles can be directly secured to each other in side-by-side relation.

In accordance with an aspect of this invention, in a storage receptacle for a magnetic tape cassette comprising a housing having spaced apart, parallel side walls which, between their forward edges, define an opening of the housing, and a holder pivotally connected with the housing for swinging movement through such opening between an opened position in which the holder projects forwardly from the housing for receiving and relinquishing a cassette, and a closed position in which the holder cooperates with the housing for enclosing a cassette in the receptacle; the pivotal connection of the holder with the housing provides a fulcrum for the holder which is spaced rearwardly from the center of gravity of the holder with a cassette therein in all positions of the holder ranging from its closed position to its opened position so that the force of gravity urges the holder from its closed position to its opened position upon the release of a latch provided for releasably retaining the holder in its closed position, and the fulcrum defined by the pivotal connection of the holder with the housing is shifted in respect to the latter in the course of the swinging movement of the holder between its closed and opened positions. More particularly, in the case where the housing has substantially rectangular side walls and the holder includes a front wall dimensioned to close the front opening of the housing and a bottom wall directed at right angles to the front wall of the holder to form a corner therewith which moves downwardly in respect to the housing in the course of the swinging movement of the holder away from its closed position, the fulcrum for the holder is shifted forwardly at an intermediate position of the holder in moving from its closed position to its opened position so that, during further swinging movement of the holder to its opened position, the previously mentioned corner of the holder will move upwardly in respect to the housing. By reason of such forward shifting of the fulcrum for the pivoted holder, even when the vertical dimension of the rectangular housing does not greatly exceed the corresponding dimension of the cassette to be contained in the receptacle, the lower corner of the holder will not extend below the housing in the opened position of the holder at which the latter is disposed for conveniently receiving or relinquishing a cassette in the holder.

In accordance with another feature of this invention, the holder, when in its closed position, is substantially contained in the housing, and the outer surfaces of the opposite side walls of the housing have mating elongated projections and grooves of dovetail cross-sections extending from the front and rear edges of such side walls for only minor portions of the front-to-rear dimension of the side walls, so that the housings of a plurality of storage receptacles can be conveniently secured together directly in side-by-side relation with each groove of one housing slidably receiving a respective elongated projection of the next adjacent housing.

The above, and other objects, features and advantages of the invention, will be apparent in the following detailed description of illustrative embodiments thereof which is to be read in connection with the accompanying drawings.

DESCRIPTION OF THE PREFERRED EMBODIMENTS

Figure 1:
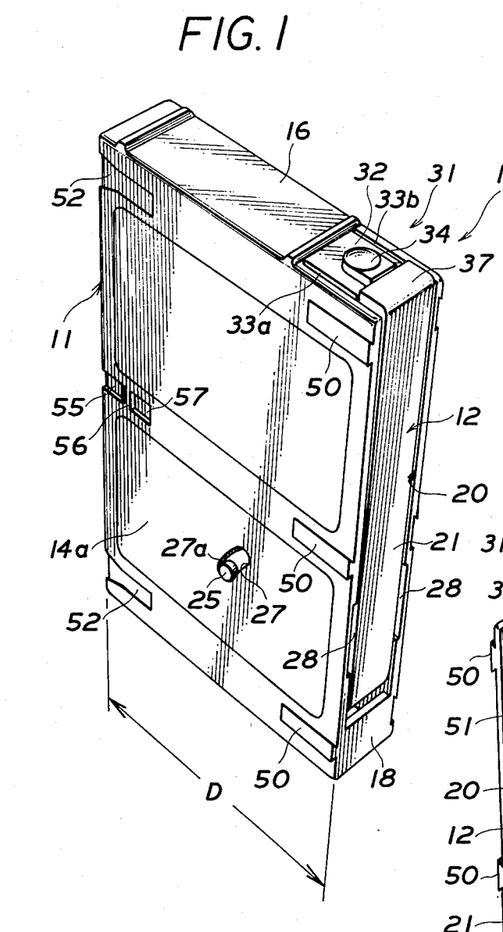
FIG. 1 is a perspective view of a magnetic tape cassette storage receptacle according to an embodiment of this invention, and which is shown in its closed condition.
Figure 2:
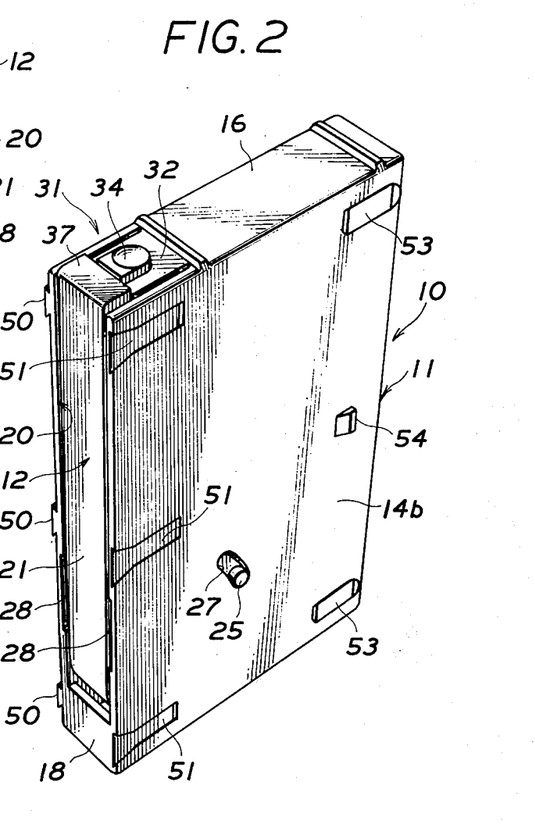
FIG. 2 is a perspective view similar to that of FIG. 1, but showing the opposite side of the storage receptacle.
Figure 3:
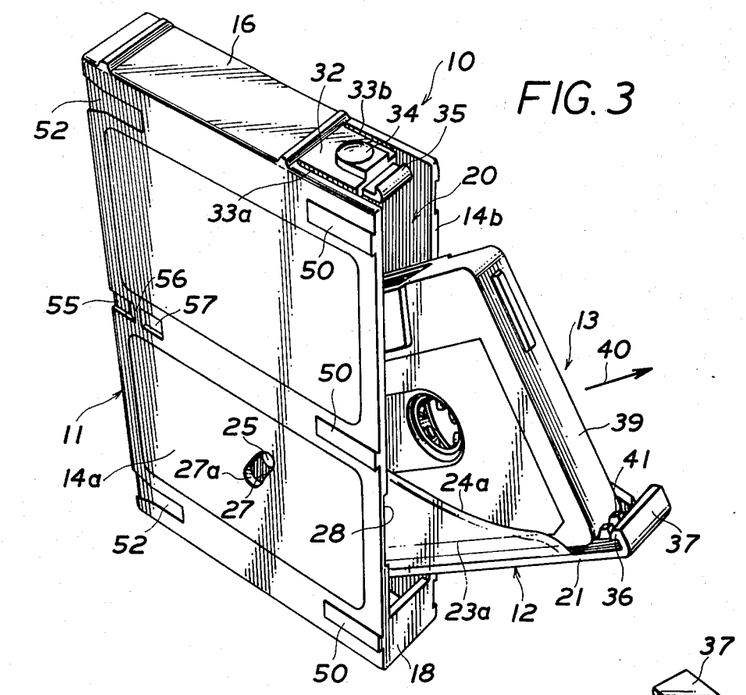
FIG. 3 is a perspective view similar to that of FIG. 1, but showing the storage receptacle in its open condition with a magnetic tape cassette cradled in the holder of the storage receptacle.

Referring to the drawings in detail, and initially to FIGS. 1-3 thereof, it will be seen that a magnetic tape cassette storage receptacle 10 according to this invention generally comprises a housing 11 and a holder 12 which is pivotally connected with housing 11 for swinging movement relative to the latter between an opened position (FIG. 3) in which holder 12 projects forwardly from housing 11 for receiving and relinquishing a cassette 13, and a closed position (FIGS. 1 and 2) in which holder 12 cooperates with housing 11 for enclosing a cassette cradled in the holder.

Figures 6, 7:
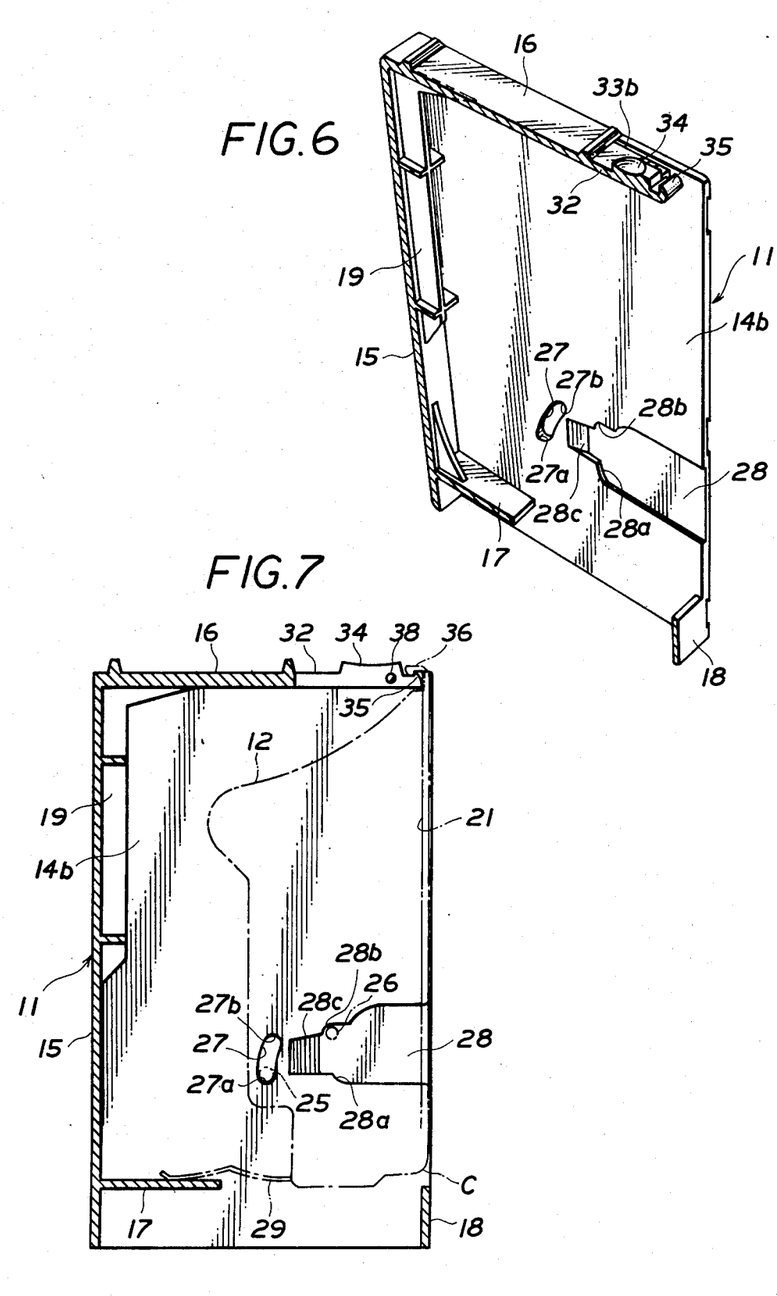
FIG. 6 is a perspective view, partly broken away and in section, of the housing which forms a part of the storage receptacle of FIGS. 1-3.
FIG. 7 is a vertical sectional view of the housing, with the holder being shown in broken lines in its closed position.

The housing 11 which is preferably molded of a suitable plastic resin is shown to include spaced apart, parallel side walls 14a and 14b which are substantially rectangular (FIGS. 1–3 and 6–9), and which are joined together by a back wall 15, a top wall 16, a shelf or abutment 17 directed forwardly from the lower end portion of back wall 15, and a cross piece 18 extending between the lower end portions of side walls 14a and 14b at the front of housing 11. Further, as shown, a stiffening web arrangement 19 may extend along the upper portion of back wall 15 from the back end portion of top wall 16 (FIGS. 6 and 7). In the foregoing housing 11, a vertically elongated opening 20 is defined at the front of the housing between the forward edges of side walls 14a and 14b above cross piece 18.

Figure 4:
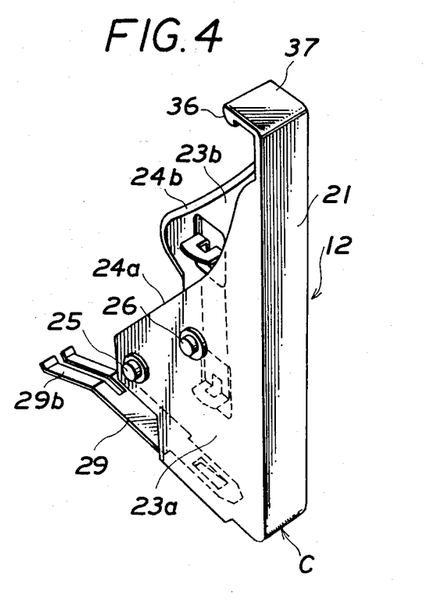
FIG. 4 is a perspective view of the holder which forms a part of the storage receptacle shown on FIGS. 1-3.
Figure 5:
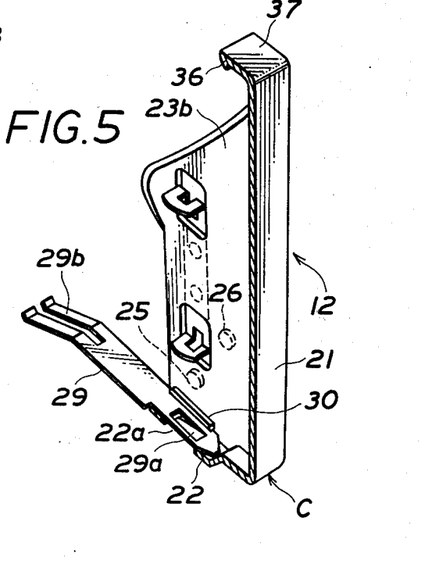
FIG. 5 is a perspective view similar to that of FIG. 4, but showing the holder partly broken away and in section.

As shown particularly on FIGS. 4 and 5, the holder 12, which is also preferably molded of a plastic resin, includes a front wall 21 dimensioned to close opening 20 in the closed position of holder 12, a bottom wall 22 directed substantially at right angles to front wall 21 for defining a corner C at the bottom of the latter, and spaced apart side walls 23a and 23b directed upwardly from bottom wall 22 along the opposite sides of front wall 21. The side walls 23a and 23b of holder 12 are suitably spaced apart to accommodate a magnetic tape cassette 13 therebetween, and preferably have upper edges 24a and 24b, respectively, that are inclined downwardly from front wall 21 and bevelled inwardly.

In order to pivotally connect holder 12 with housing 11, first laterally aligned pivot members 25 project outwardly from side walls 23a and 23b of holder 12 at a substantial distances from front wall 21, and second laterally aligned pivot members 26 also project outwardly from side walls 23a and 23b and are located closer to front wall 21 than pivot members 25 at a greater distance upwardly from bottom wall 22.

Figure 8:
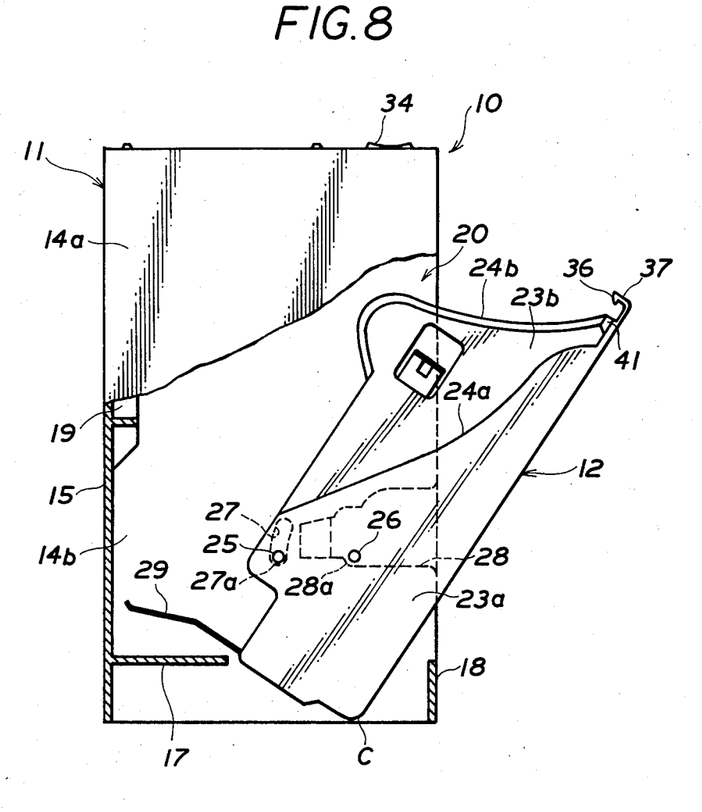
FIGS. 8 and 9 are side elevational views of the storage receptacle according to this invention with the housing thereof being shown partly broken away and in section, and with the holder being respectively shown at an intermediate position between its closed and opened positions, and at its opened position.
Figure 9:
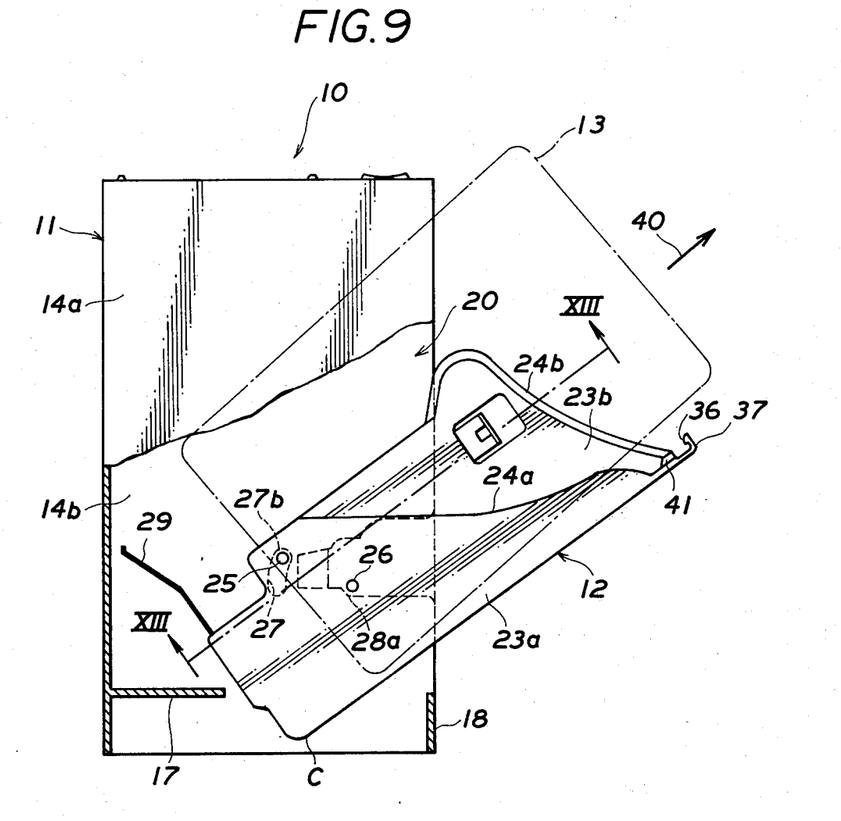

The side walls 23a and 23b of holder 21 are movable between side walls 14a and 14b of housing 11, and such side walls 14a and 14b are formed with arcuate slots 27 therein which extend generally vertically, and which are adapted to slidably receive the first pivot members 25 extending from the adjacent side walls 23a and 23b of holder 12. The slots 27 are located so that, with pivot members 25 of holder 12 engaging first seats defined at the lower ends 27a of slots 27 and with front wall 21 of the holder extending vertically, such front wall 21 will be disposed between the forward edges of side walls 14a and 14b above cross piece 18 and will close front opening 20 of housing 11 (FIGS. 1 and 2). Further, as shown particularly on FIGS. 6 and 7, the inner surfaces of side walls 14a and 14b of the housing have recesses 28 extending forwardly in respect to the slots 27 and opening at the forward edges of side walls 14a and 14b for loosely accommodating the second pivot members 26 which project from the adjacent side walls 23a and 23b of holder 12 (FIGS. 7–9). The lower margin of each recess 28 has an upwardly curved portion 28a (FIG. 7) defining a second seat for the respective second pivot member 26 and which is at approximately the same level as the first seat 27a defined at the bottom of the respective slot 27. Further, the upper margin of each recess 28 has a downwardly curved portion 28b which forms a stop for limiting the upward movement of the respective second pivot member 26. Finally, each recess 28, at its end adjacent the respective slot 27 has an inclined ramp 28c leading from the recess to the inner surface of the respective side wall 14a or 14b.

When assembling together the described housing 11 and holder 12 of storage receptacle 10, the holder 12 is initially tilted relative to housing 11, for example, as shown on FIG. 8, and the lower end portion of holder 12 is inserted into opening 20 above cross piece 18 with the first and second pivot members 25 and 26 at the opposite sides of holder 12 successively entering the respective recesses 28 at the forward edges of side walls 14a and 14b. As the inclined or tilted holder 12 is further displaced rearwardly in respect to housing 11, first pivot members 25 ride on inclined ramps 28c so as to leave recesses 28 with consequent inward flexing of the respective side walls 23a and 23b until pivot members 25 come into registry with, and snap outwardly into the respective slots 27.

As shown particularly on FIG. 5, a leaf spring 29 extends rearwardly from bottom wall 22 of holder 12 so as to be movable with the latter. In order to secure leaf spring 29 to holder 12, the forward end portion of leaf spring 29 may have a downwardly and rearwardly inclined tab 29a struck therefrom while a downwardly offset rear portion of bottom wall 22 is formed with an opening 22a to receive the tab 29a. Further, side walls 23a and 23b of holder 12 are shown to be formed with inwardly directed bars 30 spaced upwardly from the rear portion of bottom wall 22 by a small distance approximately equal to the thickness of leaf spring 29. Thus, in assembling together spring 29 with holder 12, the forward end portion of the leaf spring is moved slidably over the rear portion of bottom wall 22 under bars 30 until tabs 29a snaps into opening 22a for securing spring 29 to the holder. Spring 29 is formed with a bifurcated rear end portion 29b (FIGS. 4 and 5) which, in the closed position of holder 12, as indicated in broken lines on FIG. 7, bears downwardly on the shelf or abutment 17 provided within the lower portion of housing 11.

In order to releasably retain holder 12 in its closed position (FIGS. 1, 2 and 7) storage receptacle 10 further includes a latch mechanism 31. Such latch mechanism 31 is shown to include a resilient tongue 32 formed as a forwardly directed extension of top wall 16 of housing 11. Tongue 32 is separated from the adjacent top edge portions of side walls 14a and 14b by slots 33a and 33b so as to permit tongue 32 to be depressed downwardly between the top edge portions of walls 14a and 14b, for example, by the manual application of pressure on tongue 32 at a pad 34 provided thereon. A latch element 35 (FIGS. 3, 6 and 7) is provided at the free end of resilient tongue 32 in the form of an upwardly directed raked tooth 35 having an upwardly and rearwardly sloping front surface. The latch 31 is completed by a latch element 36 (FIGS. 3–5) in the form of a raked tooth depending from the back edge of a flange 37 directed rearwardly from the upper end of front wall 21 of holder 12. When holder 12 is moved to its closed position (FIGS. 1, 2 and 7) latch tooth 36 at the top of the holder snaps over and engages latch tooth 35 on tongue 32 so as to retain holder 12 in its closed position. On the other hand, when tongue 32 is depressed by the application of downwardly directed pressure to pad 34, latch tooth 35 is moved downwardly and thus disengaged from latch tooth 36 so as to free holder 12 for movement from its closed position to its opened position.

Figure 10:
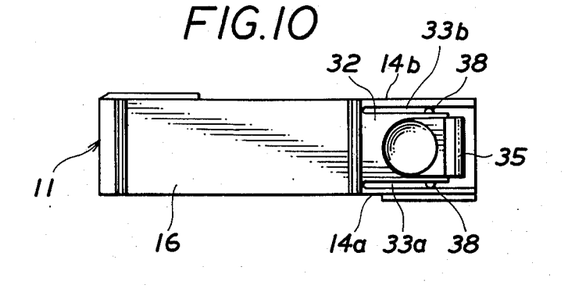
FIG. 10 is a top plan view of the housing included in the storage receptacle of FIGS. 1-9, and particularly showing details of a latch element forming an integral part of such housing.

Since housing 11 is preferably molded of a plastic resin, side walls 14a and 14b are somewhat resiliently flexible, particularly at their forward upper portions where slots 33a and 33b separate the side walls from tongue 32. thus, if side walls 14a and 14b are grasped and pressed toward each other at the forward upper portions thereof when a force is being applied downwardly to pad 34 for releasing latch 31, there is a possibility that side walls 14a and 14b will be flexed toward each other to seize the upper part of holder 12 and thereby inpede the movement of holder 12 toward its open position even though latch 31 is released. In order to avoid the foregoing, projections 38 (FIGS. 7 and 10) extend from the opposite longitudinal edges of tongue 32 across slots 33a and 33b into engagement with the adjacent side walls 14a and 14b of housing 11. Thus, even if the forward upper portions of side walls 14a and 14b are pressed toward each other, projections 38 prevent the narrowing of the space between the side walls and thereby ensure that holder 12 will be free to move toward its opened position upon the release of latch 31.

As is shown on FIG. 3, the conventional magnetic tape cassette 13 having a generally rectangular cassette housing 39 is disposed or cradled between side walls 23a and 23b of holder 12 with one of the relatively long sides of cassette housing 39 extending along front wall 21, and with a relatively short side of the cassette housing resting against bottom wall 22 of the cassette housing. When holder 12 is in its opened position (FIGS. 3 and 9) cassette 13 may be conveniently withdrawn therefrom in the forward and upward direction, as indicated by the arrow 40. In order to ensure that flange 37 and latch tooth 36 thereon will not interfere with such withdrawal of the cassette 13 from holder 12, inclined projections 41 (FIGS. 3, 8 and 9) are formed on front wall 21 a short distance below flange 37 and act to upwardly deflect the adjacent corner of cassette housing 39 as the cassette is being withdrawn from holder 12.

In the closed position of holder 12 (FIG. 7) a cassette cradled in the holder is held against substantial movement in the forward and rearward directions between web structure 19 at the back of housing 11 and front wall 21 of the holder and, in the vertical direction, between bottom wall 22 of the holder and the projections 41 adjacent the upper end of front wall 21. Further, in the closed position of holder 12, pivot members 25 engage the respective seats 27a at the lower ends of slots 27 for initially defining the fulcrum of pivotal movement of holder 12, while pivot members 26 engage the respective stops 28b defined by the upper margins of recesses 28 to prevent lifting of holder 12, and hence disengagement of latch tooth 36 from latch tooth 35, under the influence of the upwardly directed force of spring 29 bearing on abutment 17.

In accordance with the present invention, pivot members 25 are disposed so that the fulcrum for holder 12 defined by the engagement of such pivot members 25 with seats 27a in the closed position of holder 12 will be spaced rearwardly in respect to the center of gravity of holder 12 with a cassette in the latter. Thus, when latch 31 is released by depressing tongue 32, the force of spring 29 in combination with the force of gravity will cause forward pivotal movement of holder 12 away from its closed position about the fulcrum defined by the engagement of pivot members 25 with seats 27a. Following the initial pivotal movement of holder 12 from its closed position, leaf spring 29 will lift off seat or abutment 17 and thus no longer influence the movement of holder 12.

In the course of the forward pivotal movement of holder 12 away from its closed position about the fulcrum defined by the engagement of pivot members 25 with seats 27a, pivot members 26 move downwardly in an arcuate path within recesses 28 and, when holder 12 attains the intermediate position shown on FIG. 8, will engage the seats 28a defined at the lower margins of recesses 28. It will be apparent that, during the pivotal movement of holder 12 from its closed position to the intermediate position of FIG. 8, the corner C at the lower end of holder 12 has been moving downwardly and attains approximately the level of the lower edges of side walls 14a and 14b of the housing when holder 12 reaches the intermediate position of FIG. 8. Upon the engagement of pivot members 26 with seats 28a which are disposed substantially vertically above corner C with holder 12 in the intermediate position of FIG. 8, further forward pivotal movement of the holder about the fulcrum defined by the engagement of pivot members 25 with seats 27a is prevented. However, in accordance with this invention, pivot members 26 are located so that, when holder 12 attains the intermediate position of FIG. 8, the engagement of pivot members 26 with seats 28a defines a fulcrum for holder 12 which is disposed rearwardly in respect to the center of gravity of holder 12 with a cassette therein. Therefore, forward pivotal movement of holder 12 continues beyond the intermediate position of FIG. 8 about the fulcrum defined by the engagement of pivot members 26 with seats 28a. During such further forward pivotal movement of holder 12, pivot members 25 move upwardly in arcuate slots 27 until pivot members 25 engage the upper ends 27b of the respective slots and thereby limit the forward pivotal movement of holder 12 at the opened position thereof (FIG. 9).

It will be apparent from the above that, in all positions of holder 12 ranging from its closed position to its opened position, the fulcrum for pivotal movement of holder 12 is spaced rearwardly from the center of gravity of the holder with a cassette therein. Thus, upon the release of latch 31, holder 12 is automatically moved by the force of gravity from its closed position to its opened position. It will further be seen that, in the storage receptacle 10 according to this invention, the fulcrum for pivotal movement of holder 12 is shifted forwardly in respect to housing 11, that is, from the position of engagement of pivot members 25 with seats 27a to the position of engagement of pivot members 26 with seats 28a, in the course of the forward pivotal movement of holder 12 from its closed position to its opened position. Such shifting of the fulcrum is advantageous in several respects. First of all, in the course of the pivotal movement of holder 12 from its intermediate position (FIG. 8) to its opened position (FIG. 9) about the fulcrum defined by the engagement of pivot members 26 with seats 28a, the lower corner C of holder 12 moves rearwardly and upwardly from its lowermost level attained at the intermediate position of FIG. 8. Thus, even though housing 11 extends downwardly only a relatively small distance below holder 12 in the closed position of the latter, holder 12 can be displaced through a large angle from its closed position to its opened position for convenience and ease in inserting and removing a cassette with holder 12 in its opened position without causing corner C of the holder to project downwardly beyond the lower end of housing 11. Thus, holder 12 can be moved through a large angle from its closed position to its opened position without requiring an undesirably large vertical dimension of housing 11 merely for the purpose of continuing to contain the corner C of the holder within the housing in the opened position of the holder.

Furthermore, it will be seen that, as holder 12 moves pivotally from its closed position toward its opened position, the center of gravity of holder 12 with a cassette therein moves forwardly with respect to pivot members 25. Thus, if the fulcrum for holder 12 was continuously defined by pivot members 25, the force of gravity urging the holder toward its opened position would progressively increase and result in a rapid or abrupt final movement of the holder to its opened position. However, by forwardly shifting the fulcrum for holder 12 from the engagement of pivot members 25 with seats 27a to the engagement of pivot members 26 with seats 28a when holder 12 attains the intermediate position of FIG. 8, the moment arm of the force of gravity continuing to urge holder 12 toward its opened position is reduced with the result that holder 12 undergoes a smooth and gentle continuous movement from its closed position to its opened position.

Figure 11:
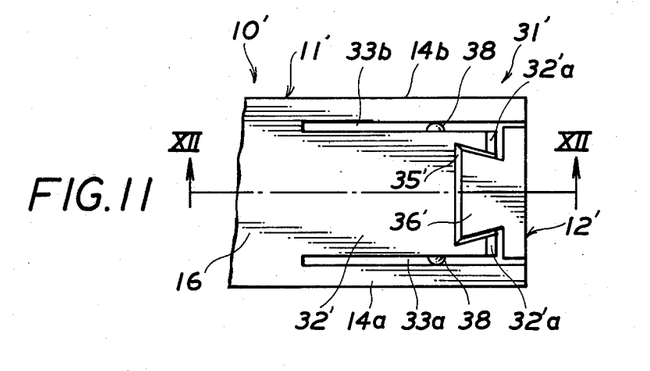
FIG. 11 is an enlarged, fragmentary top plan view showing another embodiment of a latch assembly that may be employed in a storage receptacle according to this invention.
Figure 12:
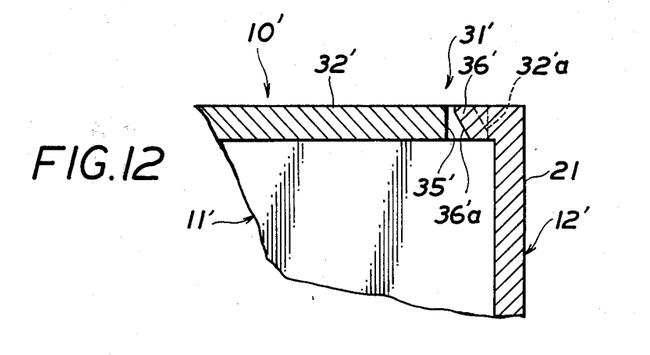
FIG. 12 is a detail sectional view taken along the line XII—XII on FIG. 11.

Referring now to FIGS. 11 and 12, it will be seen that, in a storage receptacle 10′ which is otherwise similar to the previously described storage receptacle 10 according to this invention, the latch 31′ for releasably retaining the holder 12′ in its closed position relative to the housing 11′ may again include a resilient tongue 32′ extending forwardly from the top wall 16 of housing 11′ and being separated from the adjacent top edges of side walls 14a and 14b by slots 33a and 33b. In the latch 31′, the free end portion of tongue 32′ has a keystone-shaped cutout 35′ therein to define one latch element, while the other latch element is constituted by a complementary keystone-shaped projection 36′ directed rearwardly from the top end of front wall 21 of holder 12′. When keystone-shaped projection 36′ is engaged in the similarly shaped cutout 35′, that is, when latch 31′ is engaged, holder 12′ is retained in its closed position. However, when tongue 32′ is depressed, projection 36′ is released from cutout 35′ so as to free holder 12′ for movement toward its opened position. In order to effect engagement of projection 36′ in cutout 35′ upon return of holder 12′ to its closed position, the free end edge 32′a of tongue 32′ is bevelled at the opposite sides of cutout 35′, and the end edge 36′a (FIG. 12) of porjection 36′ is similarly bevelled. Thus, as holder 12′ returns to its closed position, bevelled edge surface 36′a will ride over bevelled edge surfaces 32′a to depress tongue 32′ until projection 36′ engages in cutout 35′.

Figure 13:
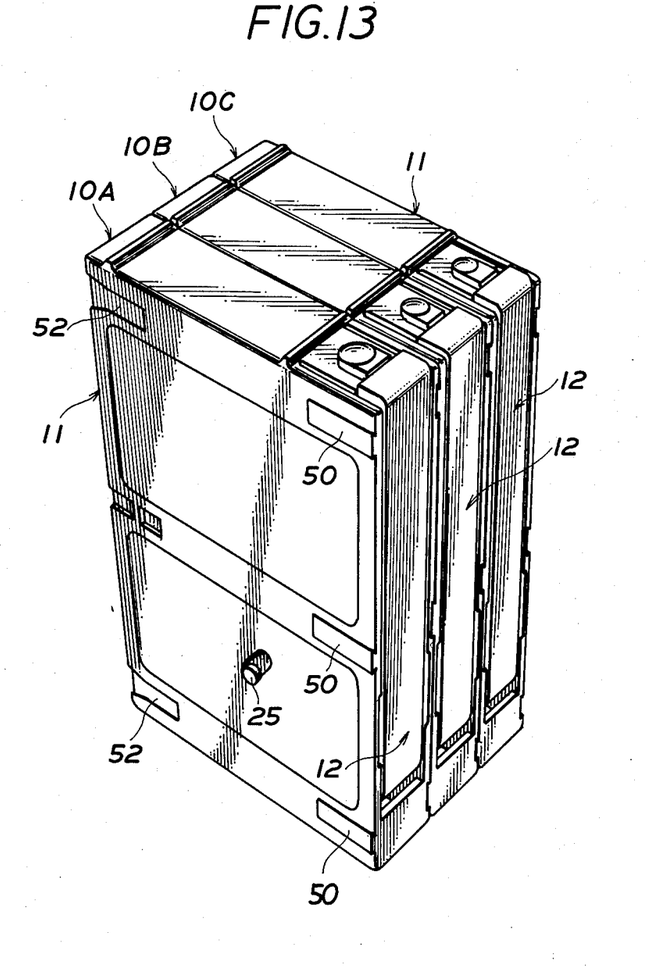
FIG. 13 is a perspective view illustrating a plurality of storage receptacles according to this invention secured together in side-by-side relation.

As shown on FIG. 13, a plurality of storage receptacles according to this invention, for example, the storage receptacles 10A, 10B and 10C, are adapted to be secured to each other in side-by-side relation so that, when thus secured to each other, the holders 12 of the storage receptacles may be moved independently of each other between their opened and closed positions. In order to provide for securing together of the storage receptacles in such side-by-side relation, the outer surface of side wall 14a of housing 11 has elongated projections 50 (FIG. 1) of dovetail cross-section extending rearwardly from the forward edge of wall 14a for only a minor portion of the front-to-rear dimension D of such side wall. The elongated projections 50 are shown to be spaced apart along the forward edge of side wall 14a, for example, disposed adjacent the top and bottom of such wall and at the middle thereof. The other side wall 14b of housing 11 has grooves 51 (FIG. 2) at its outer surface in lateral alignment with the elongated projections 50, with each of the grooves 51 extending from the forward edge of side wall 14b and having a length and dovetail cross-section corresponding to the length and cross-section of the respective projection 50 on the other side wall 14a. Further, the outer surface of side wall 14a has grooves 52 (FIG. 1) of dovetail cross-section extending forwardly from the rear edge of side wall 14a in longitudinal alignment with the projections 50 14a adjacent the top and bottom of housing 11. The length of each of the grooves 52 is selected to provide a substantial distance between the forward end of such groove 52 and the back end of the projection 50 with which it is aligned. The other side wall 14b of housing 11 has elongated projections 53 (FIG. 2) on its outer surface in lateral alignment with the grooves 52, with each projection 53 extending forwardly from the rear edge of side wall 14b and having a length and dovetail cross-section corresponding to the length and cross-section of the respective groove 52 in side wall 14a. Side wall 14b is further shown to have a detent projection 54 with sloping front and rear faces which extends from the rear portion of wall 14b in alignment with the central one of the grooves 51 in such side wall Finally, as shown on FIG. 1, the outer surface of side wall 14a is formed with a recess 57 at a location corresponding to that of the detent projection 54 on side wall 14b. Such recess 57 is separated by a barrier 56 from an aligned recess 55 extending to the rear edge of wall 14a.

By reason of the foregoing arrangement of projections 50 and 53 and of grooves 51 and 52 on each housing 11 the securing together of two storage receptacles according to this invention is facilitated. Thus, for example, when securing the storage receptacle 10A to the storage receptacle 10B on FIG. 13, the housings 11 of such storage receptacles are initially positioned laterally side-by-side, but with the housing of receptacle 10B disposed ahead of the housing of receptacle 10A by a distance slightly greater than the length of each elongated projection 50. Thus, the flat surface of side wall 14b of receptacle 10A can facially abut against the flat surface of side wall 14a of receptacle 10B. After such initial positioning of receptacles 10A and 10B, the housing of receptacle 10A is moved forwardly relative to the housing of receptacle 10B so as to cause elongated projections 50 of receptacle 10B to enter grooves 51 of receptacle 10A while projections 53 of the latter simultaneously enter the grooves 52 of receptacles 10B. In order to facilitate the entry of elongated projections 50 and 53 into grooves 51 and 52, respectively, the forward ends of grooves 51 and the back ends of grooves 52 may be widened, as shown on FIGS. 1 and 2.

In the course of the above described forward movement of the housing 11 of receptacle 10A relative to the housing of receptacle 10B, the detent projection 54 of receptacle 10A will move along recess 55 of receptacle 10B and finally snap past barrier 56 into recess 57 for releasably securing the housings 11 of receptacles 10A and 10B in lateral alignment with each other as shown on FIG. 20.

It will be seen that, since the holder 12 of each of the secured together receptacles 10A, 10B and 10C is substantially fully contained within the respective housing 11 when the holder is in its closed position, the direct securing together of the housings 11 in side-by-side relation does not interfere with the individual movements of the holders 12 between their opened and closed positions.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of this invention as defined in the appended claims.

What is claimed is:

1. A storage receptacle for a magnetic tape cassette comprising:
   a housing including spaced apart, parallel side walls which, between their forward edges, define an opening of said housing;
   a holder for embracing a magnetic tape cassette and which is movable with the cassette therein through said opening of the housing between said side walls of the latter; and
   pivot means connecting said holder with said housing for swinging movement relative to the latter between an opened position in which said holder projects forwardly from said housing for receiving and relinquishing a cassette, and a closed position in which said holder cooperates with said housing for enclosing a cassette in said holder;
   said pivot means defining a fulcrum for said swinging movement of the holder which is spaced rearwardly from the center of gravity of said holder with a cassette therein in all positions of said holder and which is shifted forwardly in respect to said housing in the course of the swinging movement of said holder from said closed position to said opened position.

2. A storage receptacle according to claim 1; in which said side walls of the housing are substantially rectangular and said opening extends vertically at the front of the housing, said holder includes a front wall dimensioned to close said opening in the closed position of the holder and a bottom wall directed at right angles to said front wall to form a corner therewith which moves downwardly in respect to said housing in the course of said swinging movement of the holder away from its closed position, and said pivot means selectively provides first and second positions for said fulcrum at different distances rearwardly from said front wall of the holder; and in which, at an intermediate position of the holder in moving from its closed position to its opened position, said fulcrum for the holder is shifted forwardly from said first position to said second position disposed above said corner so that the latter moves upwardly in respect to the housing furing further swinging movement of the holder to its opened position.

3. A storage receptacle according to claim 2; in which said pivot means includes first pivot members extending from the opposite sides of said holder, first seats in said housing engageable by said first pivot members to define said first position of the fulcrum for the holder, second pivot members extending from the opposite sides of said holder forwardly in respect to said first pivot members, and second seats in said housing engageable by said second pivot members to define said second position of the fulcrum for the holder.

4. A storage receptacle according to claim 3; in which said first seats are defined at the lower ends of generally vertically extending slots formed in said side walls of the housing and slidably receiving said first pivot members, and said side walls having recesses in their inner surfaces extending forwardly in respect to said slots and loosely accommodating said second pivot members to define said second seats at lower margins of said recesses.

5. A storage receptacle according to claim 4; further comprising spring means acting between said housing and said holder in the closed position of the latter for initiating forward swinging movement of the holder away from its closed position.

6. A storage receptacle according to claim 5; in which said spring means includes a leaf spring secured to said holder for movement with the latter and acting against an abutment in said housing when said holder is in its closed position.

7. A storage receptacle according to claim 6; in which said leaf spring extends rearwardly from said holder and bears downwardly on said abutment in said closed position of the holder, and said second pivot members bear upwardly against upper margins of said recesses when the holder is in said closed position for maintaining engagement of said first pivot members with said first seats.

8. A storage receptacle according to claim 7; in which said first pivot members engage the upper ends of said slots for limiting the swinging movement of said holder to said opened position.

9. A storage receptacle according to claim 7; further comprising latch means for releasably securing said holder in said closed position thereof.

10. A storage receptacle according to claim 9; in which said latch means includes a resilient tongue which is depressible between said side walls of the housing at the top of the latter, and latch elements on said tongue and at the top of said holder in said closed position, said latch elements engaging each other in said closed position and being released from each other when said resilient tongue is depressed.

11. A storage receptacle according to claim 10; in which said latch elements are oppositely raked teeth.

12. A storage receptacle according to claim 10; in which said latch element on the holder is a keystone-shaped projection, said latch element on the tongue is a complementary keystone-shaped cutout in the free end portion of said tongue for receiving said projection, and the free end edge of the tongue is bevelled at the opposite sides of said cutout.

13. A storage recptacle according to claim 10; in which said housing further has a top wall joined to the side walls and from which said tongue extends with slots between said tongue and the adjacent side walls, and said tongue has projections extending from the opposite sides of the tongue into said slots to prevent closing of the latter if the side walls are pressed toward each other when depressing the tongue for releasing the latch.

14. A storage receptacle according to claim 4; in which recesses have inclined ramps extending therefrom to said inner surfaces in the direction toward said slots so that, in assembling together said holder and housing, said first pivot members can move through said recesses and along said inclined ramps into said slots.

15. A storage receptacle according to claim 1; in which said holder is substantially contained in said housing in said closed position of the holder, the outer surface of one of said side walls of the housing has at least one elongated projection of dovetail cross-section extending rearwardly from its forward edge for only a minor portion of the front-to-rear dimension of said one side wall, and the other of said side walls of the housing has a groove in its outer surface for each said elongated projection, each said groove extendng from the forward edge of said other side wall and having a length and dovetail cross-section corresponding to the length and cross-section of the respective projection on said one side wall so that the housings of a plurality of storage receptacles can be directly secured together in side-by-side relation with each said groove of one housing slidably receiving a respective elongated projection of the next adjacent housing.

16. A storage receptacle according to claim 15; in which said one side wall of the housing has a plurality of said elongated projections spaced apart along said forward edge thereof.

17. A storage receptacle according to claim 16; in which said one side wall of the housing has a groove of dovetail cross-section in its outer surface extending forwardly from the rear edge of said one side wall in longitudinal alignment with each said projection, the length of each said groove in said one side wall is selected to provide a substantial distance between the forward end of said groove and said projection with which it is aligned, and said other side wall of the housing has an elongated projection on its outer surface for each said groove in said one side wall, each said projection on the other side wall extending forwardly from the rear edge of the latter and having a length and dovetail cross-section corresponding to the length and cross-section of the respective recess in said one side wall.

18. A storage receptacle according to claim 17; in which the outer surface of said one side wall of the housing further has a recess therein spaced forwardly from said rear edge, and said other side wall of the housing has a complementary detent projection extending from its outer surface in lateral alignment with said recess so that, when the housings of a plurality of storage receptacles are secured together in side-by-side relation, said recess of one housing can receive said detent projection of a next adjacent housing for releasably retaining the secured-together housings in lateral alignment.

* * * * *